United States Patent [19]
Kreitzberg

[11] 3,906,817
[45] Sept. 23, 1975

[54] MULTIPLE SPEED TRANSMISSION

[75] Inventor: Ernest A. Kreitzberg, Mukwonago, Wis.

[73] Assignee: Allis-Chalmers Corporation, Milwaukee, Wis.

[22] Filed: Dec. 17, 1973

[21] Appl. No.: 425,314

[52] U.S. Cl. .......... 74/740; 74/331; 74/335; 74/346

[51] Int. ...Cl.² F16H 37/00; F16H 3/08; B60K 20/16; F16H 3/22

[58] Field of Search ........... 74/331, 335, 339, 346, 74/740, 745

[56] References Cited
UNITED STATES PATENTS

| | | | |
|---|---|---|---|
| 2,445,716 | 7/1948 | Sternberg | 74/346 X |
| 2,899,834 | 8/1959 | Polomski | 74/745 X |
| 2,972,899 | 2/1961 | Wiggermann | 74/331 X |
| 2,975,656 | 3/1961 | Haverlender | 74/745 |
| 2,997,143 | 8/1961 | Steadman et al. | 74/745 X |
| 3,357,276 | 12/1967 | Vavulo et al. | 74/740 |
| 3,364,768 | 1/1968 | Powell | 74/339 |
| 3,382,735 | 5/1968 | Gatiss | 74/745 X |
| 3,581,590 | 6/1971 | Detra et al. | 74/339 |
| 3,589,483 | 6/1971 | Smith | 74/331 X |
| 3,673,890 | 7/1972 | Crooks | 74/740 X |

*Primary Examiner*—Samuel Scott
*Assistant Examiner*—Lance W. Chandler
*Attorney, Agent, or Firm*—Arthur L. Nelson

[57] ABSTRACT

A multiple speed transmission having a two-speed power shift input through friction clutches driving into a main transmission with an output driving through a two-speed range transmission with positive clutches to thereby quadruple the output of the main transmission by use of the power shift input and a range transmission output in the power train.

10 Claims, 4 Drawing Figures

MULTIPLE SPEED TRANSMISSION

This invention relates to a transmission and more particularly to a main transmission having a power shift input for upshifting and downshifting the vehicle transmission while the vehicle is in motion and a range transmission with positive clutches on the output of the main transmission to thereby increase the gear ratio of the overall gear train for driving the vehicle.

Tractor transmissions deliver substantial power from the engine to drive wheels at selected gear ratios to adapt the tractor for use in various types of operations. Operations such as plowing require high torque on the drive wheels and slow speeds depending on the soil condition. Field operations such as mowing where the sickle speed must be varied due to the dampness of the hay which is being mowed or the slippage of the tractor drive wheels may require a quick shift on the tractor to shift the vehicle speed up or down while the tractor is in motion without any interruption of power transmission to the drive wheels.

With lighter draft loads the tractor usually travels at a faster speed and the torque of the drive wheels is substantially less; however, a two-speed power shift without interruption of power may be desirable since the low speed of the power shift initially starts the vehicle without any roughness in the clutch engagement while the higher speed of the power shift will be used when the tractor is in the transport or traveling speed. Accordingly, it is necessary to have a substantial number of speeds to adapt the tractor to the desired draft load. A range transmission at the output of the main transmission will double the output of the transmission. The power shift transmission at the input of the main transmission will also double the main transmission's speeds as well as provide a shift of the transmission while the vehicle is on the move.

Positive shift clutches in the main transmission and the range transmission of a tractor are usually adequate. The power shift transmission being a friction clutch transmission and having modulated pressure for operating the hydraulic actuators of the power shift clutches provides a means of increasing the gear ratios for the overall gear train and also provides a means for quick shifting the transmission while the vehicle is moving.

Accordingly, it is an object of this invention to provide friction clutches having automatic pressure modulation on input of the main transmission and a two-speed range transmission on the output of the main transmission to provide a multiple of gear ratios.

It is another object of this invention to provide a vehicle transmission having two friction clutches with automatic pressure modulation on the friction clutch to provide two-speed input to the main transmission to multiply the output speed ranges.

It is the further object of this invention to provide a manually shiftable positive clutch range transmission on the output of the main transmission and a two-speed power shift input with friction clutches and automatic pressure modulation for a power shift on the input of the main transmission of the tractor.

The objects of this invention are accomplished by providing a main transmission with positive clutches for shifting the transmission through a selected number of gear ratios and power paths. The input of the main transmission receives the power through a power shift transmission in which pressurized fluid for actuating hydraulic fluid actuators for friction clutches is automatically modulated. This provides a means for shifting a power shift transmission while the vehicle is on the move and multiplies the gear ratios from the main transmission. The output of the main transmission drives through a range transmission having positive clutches to further multiply the overall speed ratio of the gear train.

The preferred embodiment of this invention is illustrated in the attached drawings.

Figure 1:
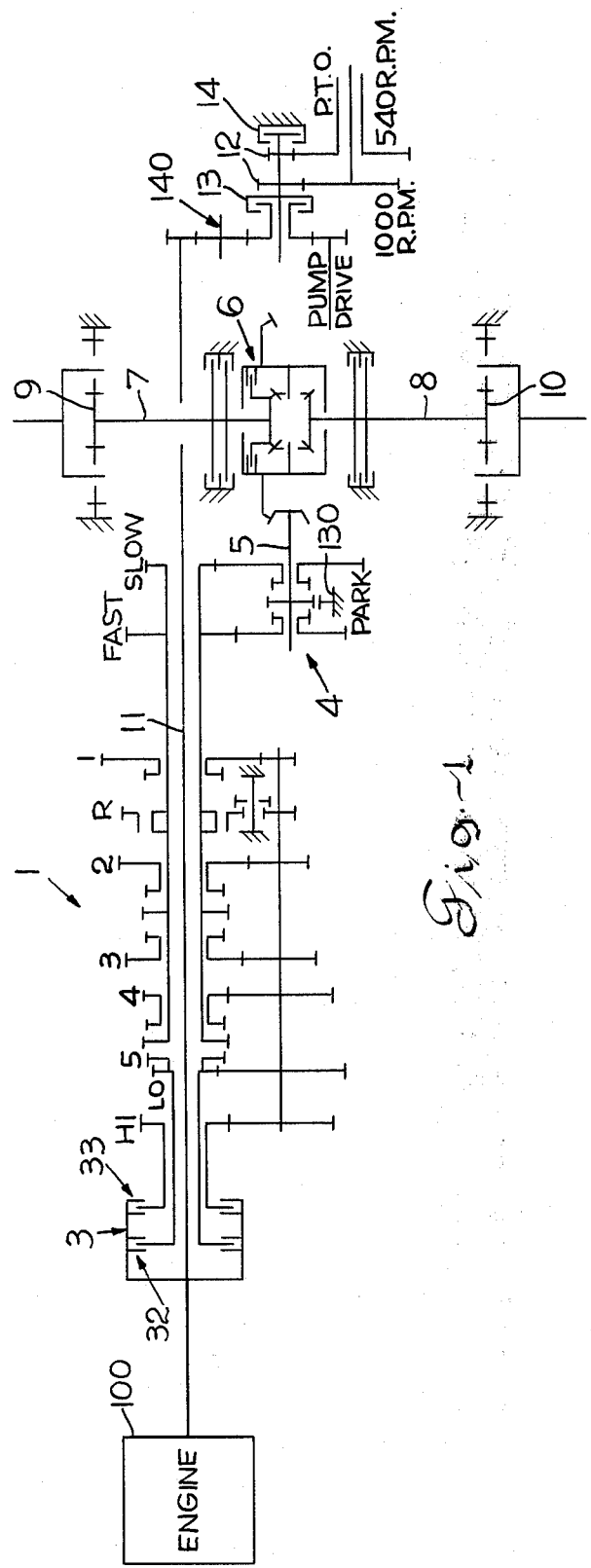
FIG. 1 is a schematic illustration of the overall gear train including the main transmission, a power shift input transmission and the range output transmission driving through the rear final drive assembly.

Referring to the drawings, FIG. 1 illustrates a main transmission 1 having a plurality of positive clutches for selectively engaging a gear ratio for driving through one of a plurality of power paths of the main transmission. Power from the engine is transmitted through the input shaft 11 and drives through a power shift transmission 3 on the input of the main transmission 1. The output of the main transmission 1 drives through a range transmission 4 having a positive clutch for selectively engaging one of two gear ratios for driving the vehicle. The park lock 130 locks the propeller shaft in the parked position. The range transmission 4 drives through the propeller shaft 5 and the differential 6. The differential 6 drives through the rear axles 7 and 8 which respectively drive through planetary gearsets 9 and 10 which would drive the drive wheels of the vehicle.

The input shaft 11 drives directly through the transmission to the power take-off gearset 12 which includes a clutch 13 and a brake 14 for selectively driving the power take-off at the 540 rpm or 1,000 rpm on the tractor.

The detailed operation of the power shift transmission will be subsequently described as well as the main transmission 1 and the range transmission 4.

Figure 2:
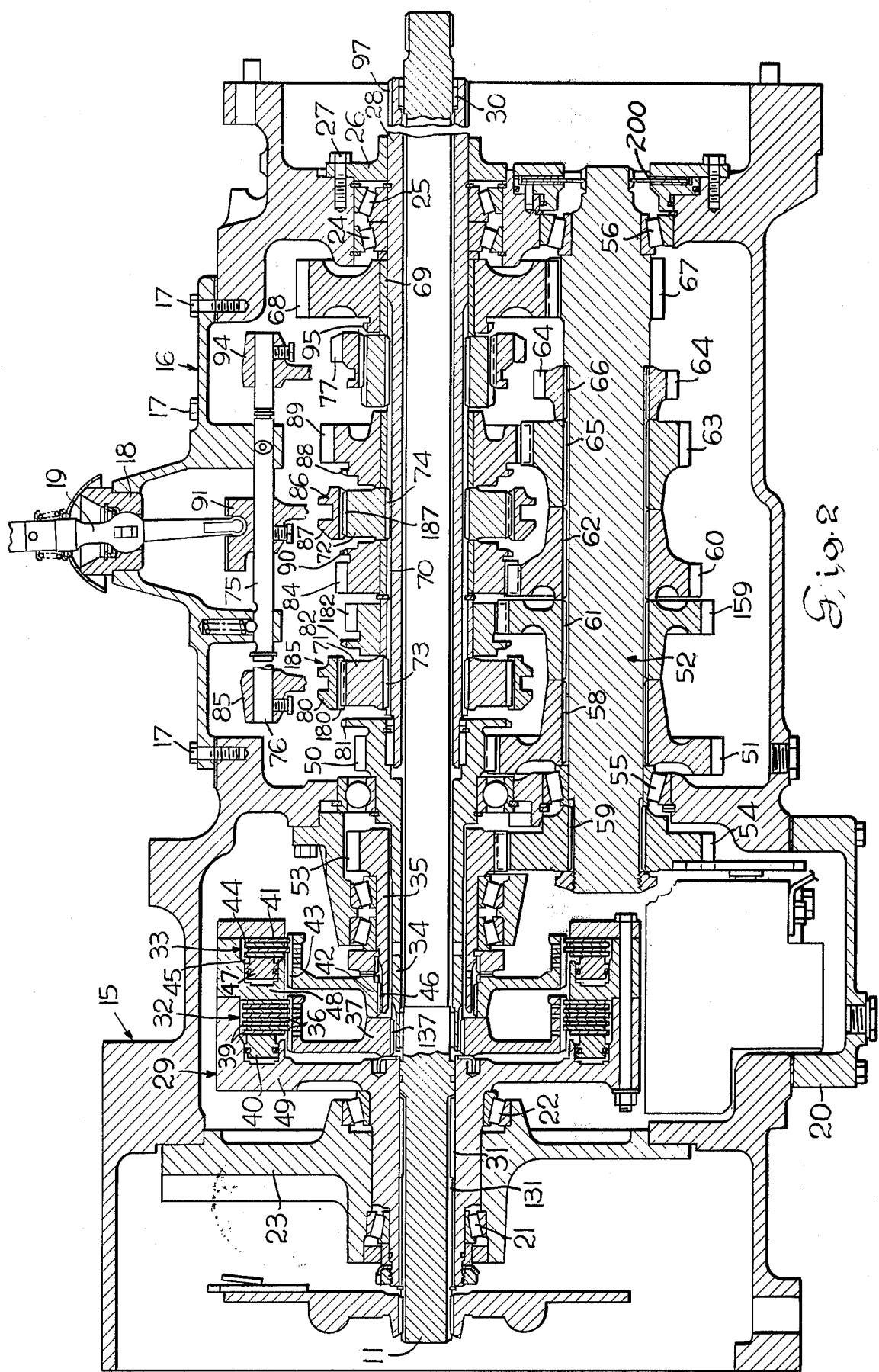
FIG. 2 illustrates a cross-section view of the main transmission and the power shift input transmission.

Referring to FIG. 2 a transmission housing 15 carries the cover plate 16 which is fastened to the housing by a plurality of bolts 17. The cover plate 16 carries the shift lever support 18 forming the socket for the shift lever 19.

The transmission housing 15 also carries the oil pan 20 on its bottom side. The shaft 11 is rotatably mounted in the bearing assemblies 21 and 22 which are supported in the bearing plate 23. The transmission housing 15 also supports the bearing assemblies 24 and 25 which are supported in the right-hand end of the transmission housing 15. The end plate 26 is fastened by bolts 27 on the end of the quill shaft 28.

The input shaft 11 extends centrally through the transmission and is supported on the left-hand end in the clutch housing 29 which is rotatably mounted in the bearing assemblies 21 and 22. The right-hand end of the input shaft 11 is rotatably mounted in the needle bearing assembly 30 which in turn is supported in the quill shaft 28. The clutch housing 29 is formed with an internal spline 31 to engage a complementary spline 131 on the input shaft 11.

Accordingly, as the input shaft 11 rotates the clutch housing 29 also rotates. The hydraulic clutch 32 and the hydraulic clutch 33 may be selectively engaged to drive the transmission either through the drive shaft 34 or the drive shaft 35. Clutch 32 includes clutch plates 36 connected to the clutch hub 37 for driving through a spline connection 137 between the clutch hub 37 and the drive shaft 34. The clutch discs 39 are connected to the clutch housing 29 to frictionally engage discs 36 when the hydraulic piston 40 is actuated.

The clutch 33 includes discs 41 connected to the clutch hub 42 through the spline connection 43. The clutch discs 44 are connected through the spline connection 45 to the clutch housing 29. The clutch hub 42 drives through the spline connection 46 to drive the drive shaft 35 when the hydraulic piston 47 of the hydraulic actuator 48 is actuated. The hydraulic actuators 48 and 49 will be discussed subsequently in the modulating circuit of FIG. 3.

The drive shaft 34 drives through the integral gear 50 which in turn meshes with the drive gear 51 and its spline connection 58 to the countershaft 52. The drive shaft 35 is integral with the drive gear 53 which drives through the drive gear 54 on the countershaft 52. The countershaft 52 is rotatably mounted on the bearing assemblies 55 and 56 in the transmission housing 15.

The countershaft 52 is connected to the driven gears 51 and 54 through spline connections 58 and 59. The countershaft 52 is also connected to the gears 159 and 60 by the spline connections 61 and 62. Gears 63 and 64 are connected to the countershaft by the spline connections 65 and 66.

Gear 67 is integral with the countershaft 52 and drives through gear 68 which is rotatably mounted on the bushing 69 carried on the quill shaft 28.

Input shaft 11 is coaxial with the quill shaft 28. The quill shaft 28 has an external spline 70 on its external periphery. The clutch sleeve 71 and clutch sleeve 72 have internal splines 73 and 74, respectively.

Shift rail 76 is operated by the shift lever 19. Clutch collar 80 is connected to clutch sleeve 71 by the spline connection 180. The clutch collar 80 is operated by the shift fork 85 to selectively engage the clutch teeth 81 of gear 50 and the clutch teeth 82 of gear 182. This combination forms the positive clutch 185.

Positive clutch 86 includes a clutch sleeve 72 slidably connected by spline connection 187 to clutch collar 87 for selectively engaging the clutch teeth 88 of gear 89 and clutch teeth 90 of gear 84. The shift fork 91 on shift rail 75 is slidably moved to move the clutch collar 87 for selective engagement of these gears connecting the gears to quill shaft 28. A transmission brake 200 is connected to the countershaft 52 to decrease rotational movement of transmission components for easier shifting.

The combination clutch sleeve and gear 77 is selectively moved by the shift fork 94 to engage the gear teeth 95 of gear 68 or engage the reverse gear 77 with an idler gear (not shown) for engagement with the gear 64 on the countershaft.

The output from the main transmission 1 drives through the quill shaft 28 and the power is taken off the spline connection 97 for driving through the range transmission 4.

Figure 3:
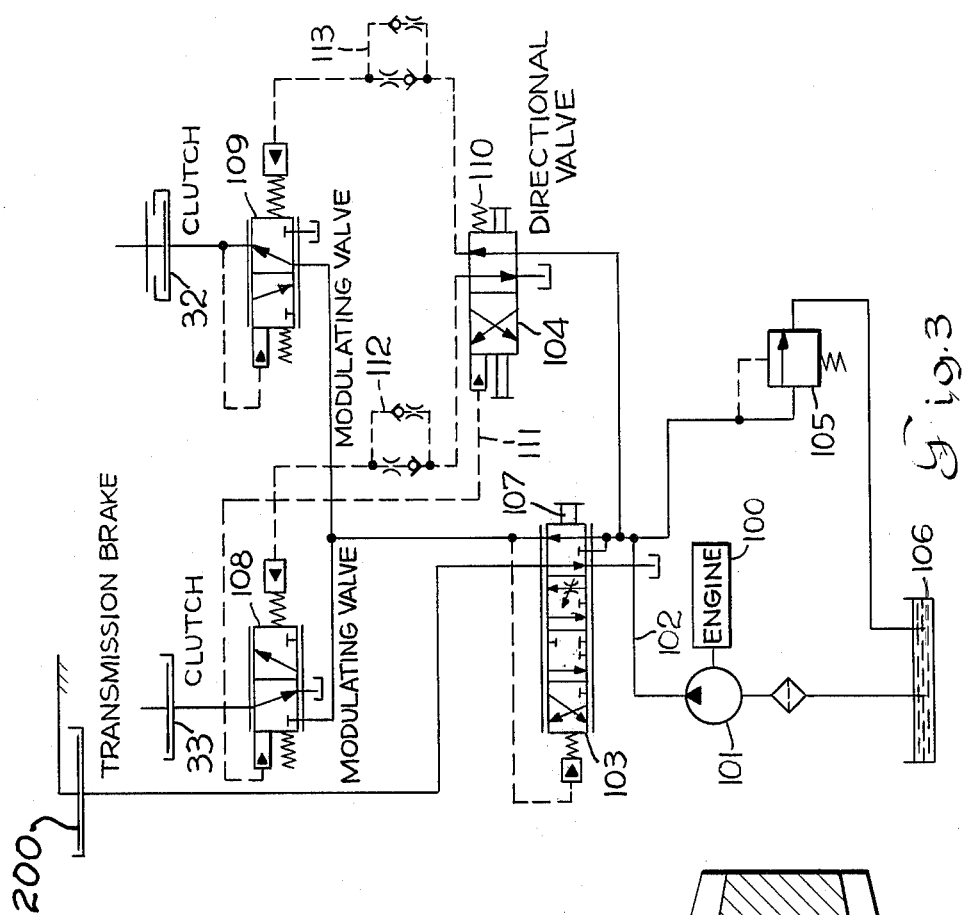
FIG. 3 is a schematic illustration of the hydraulic modulating unit for actuating the hydraulic friction clutches of the power shift transmission.

Referring to FIG. 3, the engine 100 drives the pump 101 pressurizing fluid to operate the hydraulic clutches 32 and 33. The pressurized fluid in conduit 102 is supplied to the control valve 103 and the directional valve 104. The relief valve 105 permits excess pressurized fluid to return the sump 106.

A manual control valve 107 controls the flow of pressurized fluid to modulating valves 108 and 109. Directional valve 104 is spring biased by the spring 110 in the left-hand direction and pressure biased by fluid pressure in conduit 111 in the opposite direction. Fluid pressure is supplied to the modulating valves 108 and 109 as shown. The directional valve can be moved to one of the two positions shown and the pressurized fluid passing through the directional valve 104 will be modulated as it passes through the modulating circuits 112 and 113 to release one of the clutches 32 or 33 and engage the other clutch with a transmission of power. When hydraulic fluid is throttled through the control valve 103 to reduce the pressure supplied to the modulating valves 108 and 109 the directional valve is biased to the left-hand position by the spring 110 to normally operate the low speed clutch 32. For a more complete description, operation and illustration of the modulating circuit reference may be had to U.S. Pat. No. 3,780,762 Matthews et al granted Dec. 25, 1973 entitled "Hydraulic Valve" which is of the same assignee as this patent application.

Figure 4:
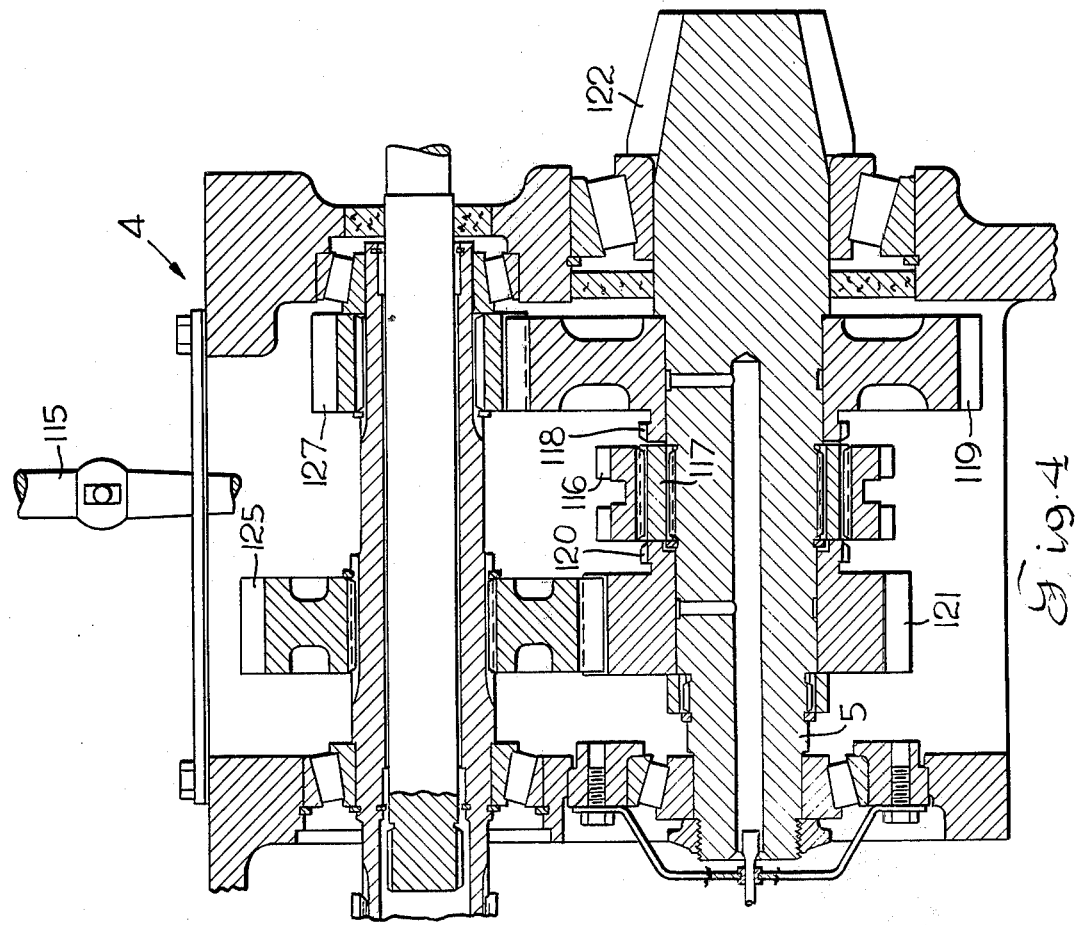
FIG. 4 is a cross-section view of the range transmission and the manual positive clutch shift mechanism.

Referring to FIG. 4, the range transmission 4 is illustrated. The shift lever 115 is connected by a shifting fork to the clutch collar 116 which slidably moves on the clutch sleeve 117 for selective engagement with the gear teeth 118 on gear 119 or the gear teeth 120 on the gear 121. The propeller shaft 5 drives the bevel gear 122 which in turn drives the differential 6. The range transmission 4 provides a high speed drive through the gearsets 125 and 121 and a low speed drive through the gearsets 127 and 119. The range transmission 4 is provided with a park lock 130 as schematically illustrated in FIG. 1. The park lock consists essentially of a lever having a gear segment for selectively engaging the gear teeth on the clutch collar 116 for locking the propeller shaft 5 when the vehicle is in the park position. For a more complete illustration and description of the park lock mechanism, reference may be had to the U.S. Pat. No. 3,601,231, "Parking Brake Mechanism," Kolacz et al issued Aug. 24, 1971.

The operation of this device will be described in the following paragraphs.

The engine 100 drives through the input shaft 11 which is directly connected to the power take-off drive assembly consisting of the drive assembly 140 including the power take-off clutch 13 and the brake 14. The input drive shaft 11 is also selectively connected to the main transmission 1 through the clutches 32 and 33 of the power shift transmission 3 including hydraulic actuators 48 and 49 which are connected through a hydraulic fluid system. Automatic modulating valves increase the pressure on one of the hydraulic actuators while decreasing the pressure on the other hydraulic actuators for smooth transmission of power through either of the two clutches. The control valve 103 controls the actuation of the clutches while the directional valve 104 selectively operates one or the other of the modulating valves 108 or 109. The power shift transmission provides for doubling of the gear ratios of the main transmission 1. The main transmission as shown is a 5-speed transmission with one reverse.

The main transmission 1 is provided with positive clutches consisting of clutch collars which can be selectively positioned to operate one of a selected number of gears in the transmission by the shift lever 19. The shift lever 19 engages one of the plurality of gears on the quill shaft 28 to drive either directly from the input shaft 11 to the quill shaft 28 or through the countershaft 52. The countershaft 52 is driven selectively from the power shift transmission 3 to operate through the gearset including gears 53 and 54 or the gearset including gears 50 and 51. The main transmission 1 drives through the range transmission 4. The range transmission 4 includes two gearsets; the first including gears 125 and 121, while the second includes gears 127 and 119. The range transmission 4 includes a clutch collar 116 operated by a shift lever 115 to selectively engage either the gearsets with the propeller shaft 5 for driving the cone gear 122 which drives a beveled ring gear of the differential 6. The differential 6 drives through the rear drive shafts 7 and 8 to drive the rear wheels.

Accordingly, the transmission includes a gear train for driving through the main transmission 1 either from the first or the second of the friction clutches in the power shift transmission 3. Driving through the clutch 32 the power paths are transmitted through the countershaft of which five gears can be selectively connected to the quill shaft 28 to provide a 5-speed drive through the transmission. Conversely driving through the clutch 33, the gear 50 can be directly coupled through the quill shaft by the positive clutch 185. Also, four gears are selectively connected for driving through the countershaft to provide a total of five speeds forward and one reverse. Accordingly, the 5-speed transmission is provided with a doubling of the overall speed of the power shift transmission driving through the main transmission 1.

The output of the main transmission drives through the range transmission 4 which again doubles the output of the main transmission by selectively connecting the first or the second of the gearsets for driving the propeller shaft. Accordingly, the 5-speed main transmission is quadrupled to provide 20 speeds forward and 4 reverse speeds for the vehicle.

The embodiments of the invention in which an exclusive property or privilege is claimed are defined as follows:

1. A multiple speed transmission for use in a vehicle comprising, a countershaft transmission including a first drive shaft rotatably mounted for rotation about the first axis and driving a first drive gear, a second drive shaft rotatably mounted for rotation about said first axis and driving a second drive gear, a countershaft rotatably mounted for rotation about a second axis, a first and second driven gear connected to said countershaft and directly engaging said first and second drive gears, respectively, a driven shaft rotatably mounted for rotation about said first axis, a plurality of gears mounted for rotation with said driven shaft, a plurality of gears mounted for rotation with said countershaft, a manual clutching means for selectively and alternatively engaging one of said plurality of gears on said driven shaft with one of said plurality of gears on said countershaft, an input shaft, a power shift transmission including a first and second pressurized hydraulic fluid actuated friction clutch including a hydraulic actuator for selectively and alternatively connecting said input shaft to said first drive shaft and said second drive shaft to effectively double the output of speed ratios from said input shaft to said driven shaft at the output of said countershaft transmission, a fluid pressure modulating valve for modulating the increase and decrease of fluid pressure applied to each hydraulic actuator, manual control means for selectively and alternatively actuating said first and said second pressurized hydraulic fluid actuated friction clutches, said fluid pressure modulating valve increasing fluid pressure to one hydraulic actuator while decreasing fluid pressure to the other hydraulic actuator for shifting said power shift transmission while said input shaft is rotating, a range transmission including at least one high-speed gearset and one low speed gearset, a range selector for selectively driving the output of said countershaft transmission through said low-speed gearset and said high-speed gearset to thereby quadruple the output of said countershaft transmission.

2. A multiple speed transmission for use in a vehicle as set forth in claim 1 wherein said countershaft transmission includes a plurality of positive clutches for selectively engaging the gear ratios and power paths driving through said transmission.

3. A multiple speed transmission for use in a vehicle as set forth in claim 1 wherein said modulating valve includes a directional valve to selectively engage and disengage the hydraulically operated friction clutches in said transmission.

4. A multiple speed transmission for use in a vehicle as set forth in claim 1 wherein said transmission includes a transmission brake.

5. A multiple speed transmission for use in a vehicle as set forth in claim 1 wherein said driven shaft defines a quill shaft.

6. A multiple speed transmission for use in a vehicle as set forth in claim 1 wherein said countershaft transmission includes a single countershaft, means connecting said plurality of gears on said countershaft for operating integrally with said countershaft.

7. A multiple speed transmission for use in a vehicle as set forth in claim 1 wherein said power shift transmission includes a clutch control to disengage both hydraulically actuated friction clutches.

8. A multiple speed transmission for use in a vehicle as set forth in claim 1 wherein said range transmission includes a first and a second positive clutch for selectively engaging said first and said second gearsets.

9. A multiple speed transmission for use in a vehicle as set forth in claim 1 wherein said range transmission includes a positive clutch for selectively engaging each of said gearsets, a drive shaft lock for selectively locking said range transmission.

10. A multiple speed transmission for use in a vehicle as set forth in claim 1 including, means selectively connecting said first drive gear to said first driven gear and connecting said second drive gear to said second driven gear for selectively driving directly to said driven shaft or through said countershaft to said driven shaft.

* * * * *